(12) United States Patent
Brewer, III et al.

(10) Patent No.: US 8,823,955 B2
(45) Date of Patent: Sep. 2, 2014

(54) AUTOMATIC IMAGE INVERTING FOR BOOK COPYING

(75) Inventors: Charles Raymond Brewer, III, Farmington, NY (US); James M. Maryniak, Batavia, NY (US)

(73) Assignee: Xerox Corporation, Norwalk, CT (US)

( * ) Notice: Subject to any disclaimer, the term of this patent is extended or adjusted under 35 U.S.C. 154(b) by 173 days.

(21) Appl. No.: 13/480,026

(22) Filed: May 24, 2012

(65) Prior Publication Data

US 2013/0314753 A1  Nov. 28, 2013

(51) Int. Cl.
*G06K 15/00* (2006.01)
*G06F 15/00* (2006.01)
*H04N 1/04* (2006.01)

(52) U.S. Cl.
USPC ............ 358/1.12; 358/1.9; 358/448; 358/474

(58) Field of Classification Search
USPC .................................. 358/1.12, 474, 448, 1.9
See application file for complete search history.

(56) References Cited

U.S. PATENT DOCUMENTS 8,462,396 B2 * 6/2013 Hirano .......................... 358/474

* cited by examiner

*Primary Examiner* — Charlotte M Baker
(74) *Attorney, Agent, or Firm* — Ronald E. Prass, Jr.; Prass LLP (57) ABSTRACT

A method and system for enabling an image production device to copy pages of a book includes determining an orientation of a first scanned page of a book, and modifying an orientation of a second scanned page of the book based on the orientation of the first scanned page. The second scanned page is in sequence relative to the first scanned page.

20 Claims, 8 Drawing Sheets

AUTOMATIC IMAGE INVERTING FOR BOOK COPYING

BACKGROUND

Disclosed herein is a method and system for automatically inverting pages for book copying, as well as the corresponding computer-readable medium.

Book copying generally requires a user to manually place pages of a book onto a scan surface of a copier for scanning. The user may use a book copier such as, for example, the WorkCentre BookMark 40 of the Xerox Corporation. The book copier may include an angled side panel to support the side of the book that is not resting on top of the scan surface. Currently when copying books on the book copier, copies associated with pages on one side of a book may be in a different orientation (e.g., inverted) from copies associated with pages on another side of the book due to positioning on the platen and beveled book edge. For simple copying to paper, this may not be an issue. However, for volume copying or for copying to a storage medium, the difference in the orientation may require time-consuming effort to realign the copies so that they will all have the same orientation.

SUMMARY

A method and apparatus for enabling automatic aligning of orientation of pages when book copying is disclosed. An orientation of a first scanned page of a book may be determined. An orientation of a second scanned page of the book may be modified based on the orientation of the first scanned page. The second scanned page is in sequence relative to the first scanned page. The determination of the orientation of the first scanned page and the modification of the orientation of the second scanned page may be performed by a computing system configured to enable book copying.

DETAILED DESCRIPTION

Aspects of the embodiments disclosed herein relate to a method for controlling orientation of scanned pages from a book, as well as corresponding device and computer-readable medium.

The disclosed embodiments may include a method for aligning orientation of scanned pages from a book. The method may include determining an orientation of a first scanned page of a book. The method may also include modifying an orientation of a second scanned page of the book based on the orientation of the first scanned page. The second scanned page is in sequence relative to the first scanned page. The determining of the orientation of the first scanned page and the modifying of the orientation of the second scanned page are to be performed by a computing system configured to enable book copying.

The disclosed embodiments may further include an image production device having a processor and an orientation alignment logic coupled to the processor. The orientation alignment logic may be configured to determine an orientation of a first scanned page of a book. The orientation alignment logic may also be configured to modify an orientation of a second scanned page of the book based on the orientation of the first scanned page. The second scanned page is in sequence relative to the first scanned page.

The disclosed embodiments may further include a computer-readable medium storing instructions for controlling orientation of scanned pages from a book. The instructions include determining an orientation of a first scanned page of a book. The instructions further include modifying an orientation of a second scanned page of the book based on the orientation of the first scanned page. The second scanned page is in sequence relative to the first scanned page. The operations of determining of the orientation of the first scanned page and modifying of the orientation of the second scanned page are to be performed by a computing system configured to enable book copying.

Figure 1:
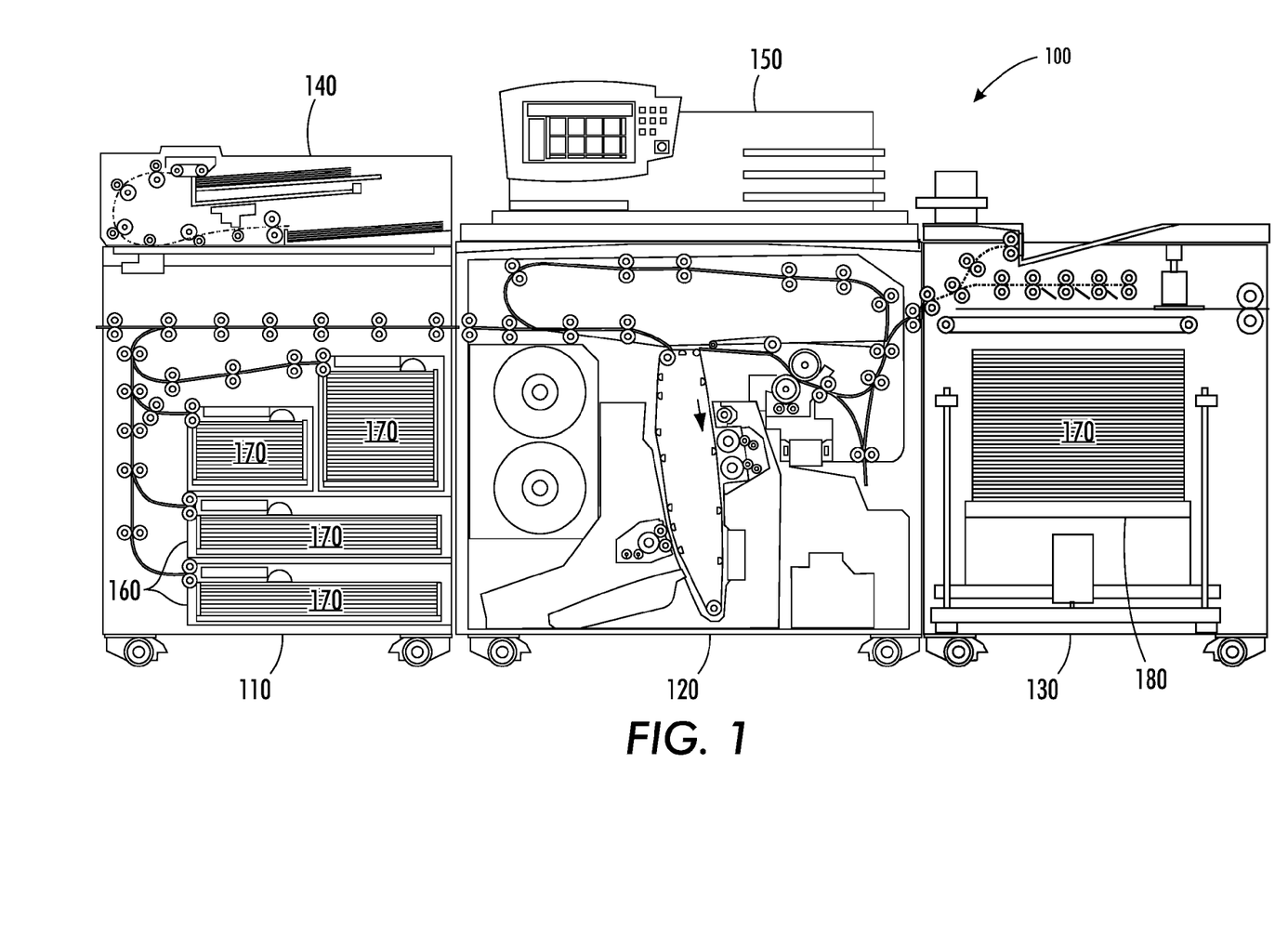
FIG. 1 is an exemplary diagram of an image production device, in accordance with one possible embodiment of the disclosure.

FIG. 1 is an exemplary diagram of an image production device in accordance with one possible embodiment of the disclosure. The image production device 100 may be any device that may be capable of making image production documents (e.g., printed documents, copies, etc.) including a copier, a printer, a facsimile device, and a multi-function device (MFD), for example.

The image production device 100 may include an image production section 120, which includes hardware by which image signals are used to create a desired image, as well as a stand-alone feeder section 110, which stores and dispenses sheets on which images are to be printed, and an output section 130, which may include hardware for stacking, folding, stapling, binding, etc., prints which are output from the marking engine.

If the printer is also operable as a copier, the printer further includes a document feeder 140, which operates to convert signals from light reflected from original hard-copy image into digital signals, which are in turn processed to create copies with the image production section 120. The image production device 100 may also include a local user interface 150 for controlling its operations, although another source of image data and instructions may include any number of computers to which the printer is connected via a network.

With reference to feeder section 110, the module includes any number of trays 160, each of which stores a media stack 170 or print sheets ("media") of a predetermined type (size, weight, color, coating, transparency, etc.) and includes a feeder to dispense one of the sheets therein as instructed.

Certain types of media may require special handling in order to be dispensed properly. For example, heavier or larger media may desirably be drawn from a media stack 170 by use of an air knife, fluffer, vacuum grip or other application (not shown in the Figure) of air pressure toward the top sheet or sheets in a media stack 170. Certain types of coated media are advantageously drawn from a media stack 170 by the use of an application of heat, such as by a stream of hot air (not shown in the Figure). Sheets of media drawn from a media stack 170 on a selected tray 160 may then be moved to the image production section 120 to receive one or more images thereon. Then, the printed sheet is then moved to output section 130, where it may be collated, stapled, folded, etc., with other media sheets in manners familiar in the art. The printed media may be place on a media stacker 180, for example.

Figure 2:
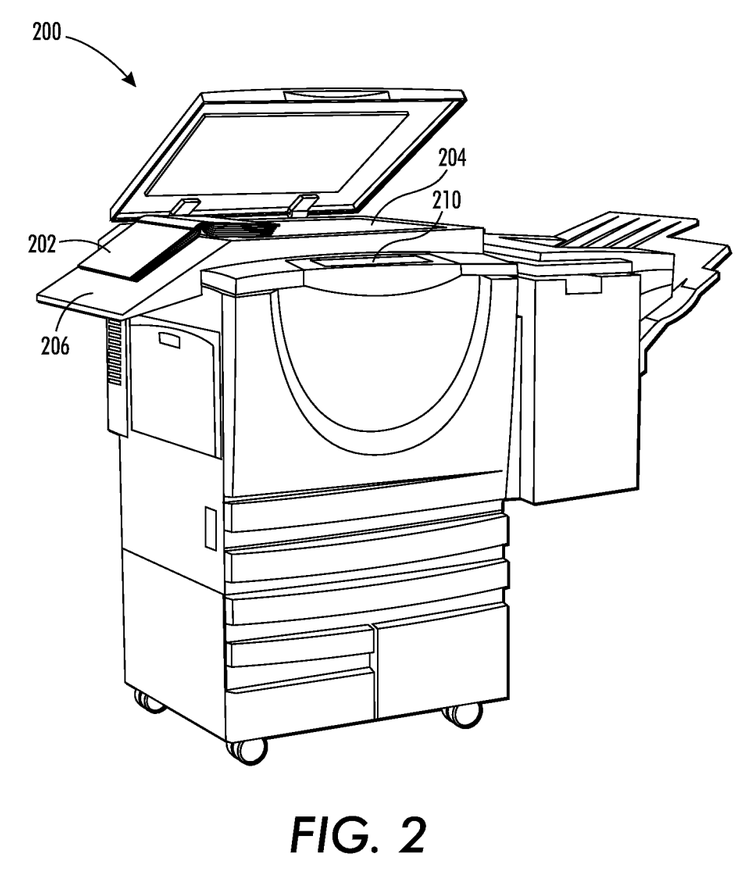
FIG. 2 is an exemplary diagram of an image of a book copier, in accordance with one possible embodiment of the disclosure.

FIG. 2 is an exemplary diagram of an image of a book copier, in accordance with one possible embodiment of the disclosure. Book copier 200 may be one form of an image production device 100 and may internally include many of the same components described with the image production device 100 (illustrated in FIG. 1). The book copier 200 may be configured to enable a user to scan pages of a book 202 by placing a side of the book 202 onto scan surface 204.

The book copier 200 may include the angled platform 206 to support the non-scanning half of the book 202. As shown, a page on the left side of the book 202 is placed on top of the scan surface 204, while pages on the right side of the book 202 is placed on top of the platform 206. In order for the user to scan a page of the right side of the book 202, the book 202 is inverted so that the page on the right side of the book 202 is placed on top of the scan surface 204, while pages on the left side of the book 202 is placed on top of the platform 206. As a result, the output of the booking copying process may include pages in different orientation.

It may be possible that the output of the book copying process is in an electronic format and stored in a storage medium such as, for example, a universal serial bus (USB) device or transmitted as an email attachment. Regardless of how the final output is generated or stored, it may be time consuming to align all the pages so that they may all be in the same orientation. The book copier 200 may include a user interface to enable the user to selection options that may be available with the book copying process. The user interface may be associated with a display screen 210.

Figure 3:
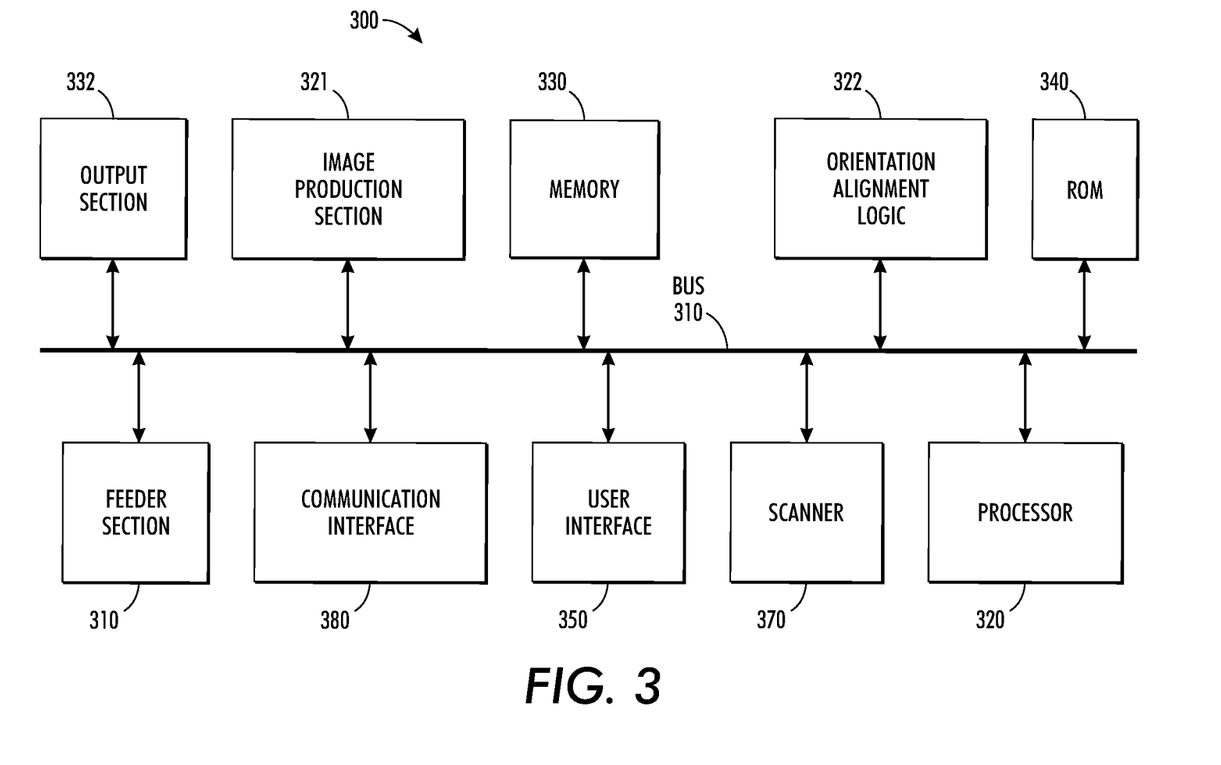
FIG. 3 is an exemplary block diagram of the processing logic of the image production device, in accordance with one possible embodiment of the disclosure.

FIG. 3 is an exemplary block diagram of the processing logic of the image production device in accordance with one possible embodiment of the disclosure. Image production device 300 along with the image production device 100 (illustrated in FIG. 1) and the book copier 200 (illustrated in FIG. 2) and the related discussion are intended to provide a brief, general description of a suitable communication and processing environment in which the disclosure may be implemented.

Although not required, the disclosure will be described, at least in part, in the general context of computer-executable instructions, such as program modules, being executed by the image production device 300, such as a communication server, communications switch, communications router, or general purpose computer, for example.

The image production device 300 may include a bus 310, a processor 320, a memory 330, a read only memory (ROM) 340, a laser imager 350, an orientation alignment logic 322, a feeder section 310, an image production section 321, an output section 332, a user interface 350, a communication interface 380, and a scanner 370. Bus 310 may permit communication among the components of the image production device 300.

The processor 320 may include at least one conventional processor or microprocessor that interprets and executes instructions. The memory 330 may be a random access memory (RAM) or another type of dynamic storage device that stores information and instructions for execution by processor 320. The memory 330 may also include a read-only memory (ROM) which may include a conventional ROM device or another type of static storage device that stores static information and instructions for processor 320.

The communication interface 380 may include any mechanism that facilitates communication via a network. For example, the communication interface 380 may include a modem. Alternatively, communication interface 380 may include other mechanisms for assisting in communications with other devices and/or systems.

The ROM 340 may include a conventional ROM device or another type of static storage device that stores static information and instructions for processor 320. A storage device may augment the ROM and may include any type of storage media, such as, for example, magnetic or optical recording media and its corresponding drive.

The output section 332 may include one or more conventional mechanisms that output image production documents to the user, including output trays, output paths, finishing section, etc., for example.

The image production section 321 may include an image printing and/or copying section, a scanner, a fuser, etc., for example.

The scanner 370 (or image scanner) may be any scanner known to one of skill in the art, such as a flat-bed scanner, document feeder scanner, etc. The image scanner 370 may be a common full-rate half-rate carriage design and can be made with high resolution (600 dpi or greater) at low cost, for example.

The image production device 300 may perform such functions in response to processor 320 by executing sequences of instructions contained in a computer-readable medium, such as, for example, memory 330. Such instructions may be read into memory 330 from another computer-readable medium, such as a storage device or from a separate device via communication interface 380.

The user interface 350 may include one or more conventional mechanisms that permit a user to input information to and interact with the image production device 300, such as a keyboard, a display, a mouse, a pen, a voice recognition device, touchpad, buttons, etc., for example. The user interface 350 may be configured to enable the user to specify a preferred orientation of the pages when the user wants to copy pages of a book.

The orientation alignment logic 322 may be configured to recognize a desired orientation of a page in a book copying process. This may be based on an input specified by a user or based on a default setting. The orientation alignment logic 322 may also be configured to modify an orientation of a page from its scanned orientation to the desired orientation.

Generally, program modules include routine programs, objects, components, data structures, etc. that performs particular tasks or implement particular abstract data types. Moreover, those skilled in the art will appreciate that other embodiments of the disclosure may be practiced in communication network environments with many types of communication equipment and computer system configurations, including personal computers, hand-held devices, multi-processor systems, microprocessor-based or programmable consumer electronics, and the like.

Operation of the orientation alignment logic 322 will be discussed below in relation to FIGS. 4-6 and the process of generating a book copy output that includes scanned pages having the same orientation will be discussed in relation to the flowchart in FIGS. 7-8, for example.

Figure 4:
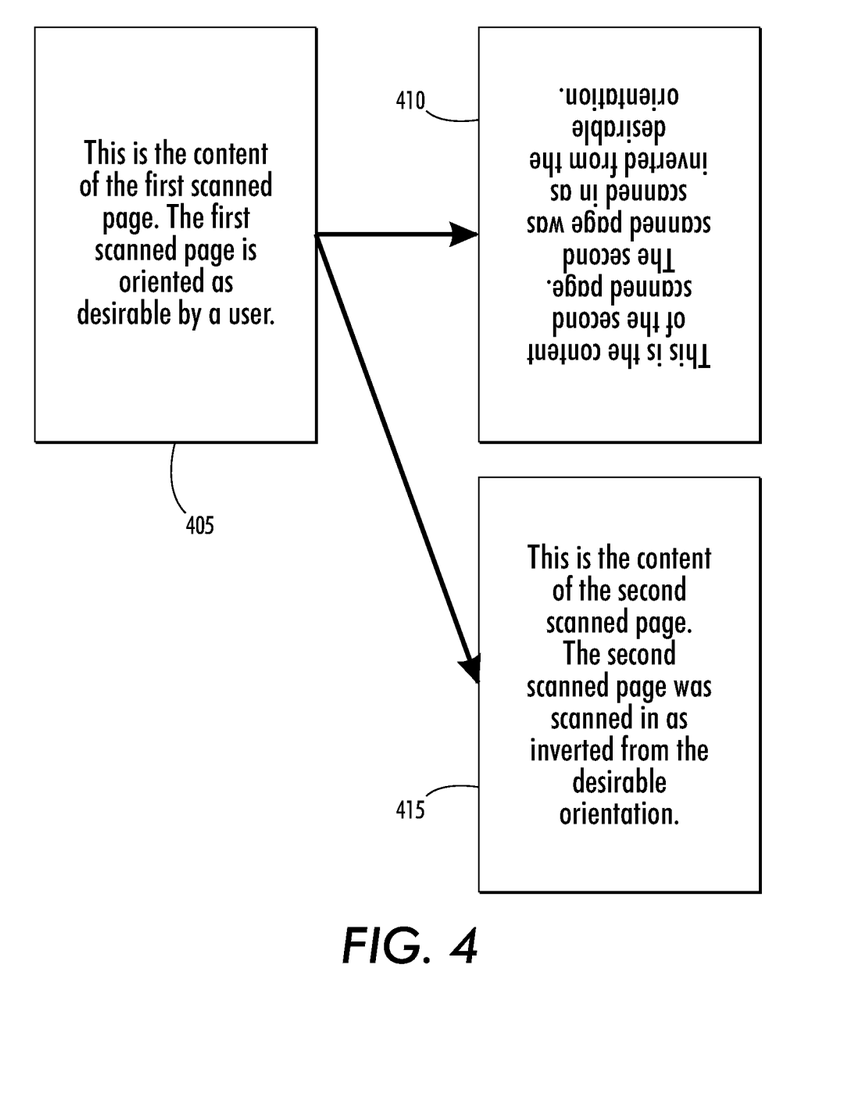
FIG. 4 is an exemplary diagram showing two sample scanned pages, in accordance with one possible embodiment of the disclosure.

FIG. 4 is an exemplary diagram showing two consecutive scanned pages from a book, in accordance with one possible embodiment of the disclosure. Scanned page 405 may correspond to a page that has an upright orientation. It may be noted that the upright orientation may be considered as an orientation that allows a user to read the content of the page without having to change the orientation of the page. Some example texts are included in the scanned page 405 to illustrate ease of readability. Scanned page 406 may correspond to a page that has an orientation that is an invert of the upright orientation. Some example texts are included in the scanned page 406 to illustrate that the texts are upside down due to the inverted orientation.

As discussed, the orientation alignment logic 322 (shown in FIG. 3) may first learn about a desired orientation (e.g., upright). The orientation alignment logic 322 may then modify the orientation of any scanned pages that may not be upright. In some example embodiments, the orientation alignment logic 322 may assume that every other scanned page is inverted and modify the orientation of those pages accordingly.

The user may be able to specify a desired orientation using the user interface 350 (shown in FIG. 3). For some embodiments, the user may specify the orientation of the first page that is scanned. For example, the user may use the user interface to indicate that the first scanned page is in the upright orientation. Referring to FIG. 4, the orientation alignment logic 322 may invert the page 410 to become page 415 such that the orientation of the pages 405 and 415 are the same. The two pages 405 and 415 may then be included in the output of the book copier as consecutive pages. The arrows connecting the pages illustrates that the pages may be consecutive.

For some embodiments, the user may indicate that the first scanned page has an orientation that is an invert of the upright orientation. For some embodiments, the user may indicate that the first scanned page has an orientation that is some angles from a vertical or horizontal axis. For example, a book may include pages having lines of texts printed from left to right instead of from top to bottom.

For some embodiments, the orientation of the first scanned page may be automatically determined as being upright, and the orientation of every subsequent alternating page may be automatically inverted. For some embodiments, a default orientation may be used. For example, the default orientation of the first scanned page may be upright or inverted. The user may be able to use the user interface to override the default orientation with a desired orientation.

Figure 5:
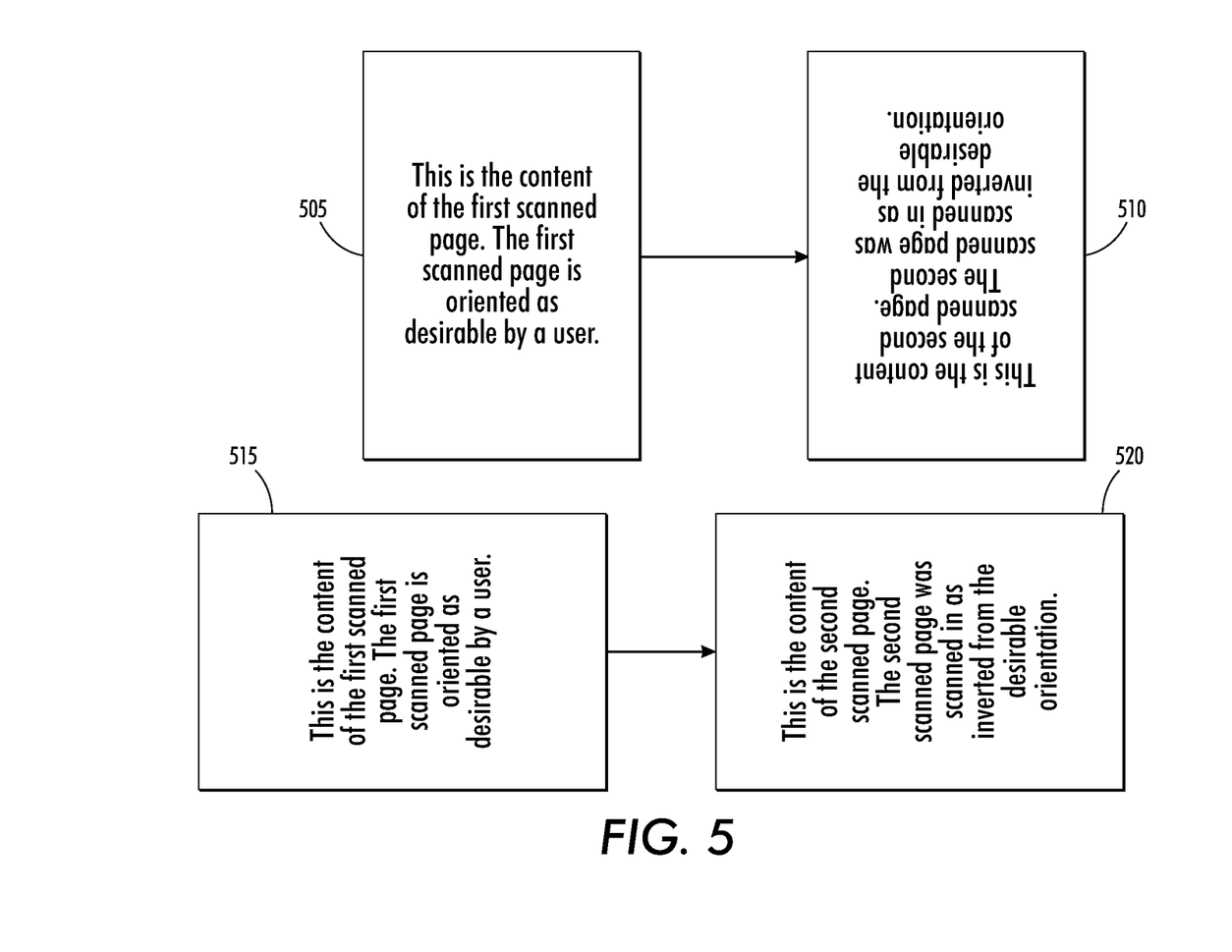
FIG. 5 is an exemplary diagram showing two sample scanned pages and two corresponding output pages having a different orientation, in accordance with one possible embodiment of the disclosure.

FIG. 5 is an exemplary diagram showing the orientation of the output pages being different from the orientation of the scanned pages, in accordance with one possible embodiment of the disclosure. It may be possible for the user to use the user interface to specify a desired orientation that may be different from the orientation of any of the scanned pages. In this example, two scanned pages 505 and 510 are shown. The scanned page 505 may correspond to a page that has an upright orientation, and the scanned page 510 may correspond to a page that has an invert orientation. The user may specify a desired orientation of the output as some angle from a vertical or horizontal axis. In this example, the desired orientation may be 90 degrees counter clockwise from an upright orientation, resulting in the output pages 515 and 520 which respectively correspond to the scanned pages 505 and 510. The arrows connecting the pages illustrates that the pages may be consecutive.

Figure 6:
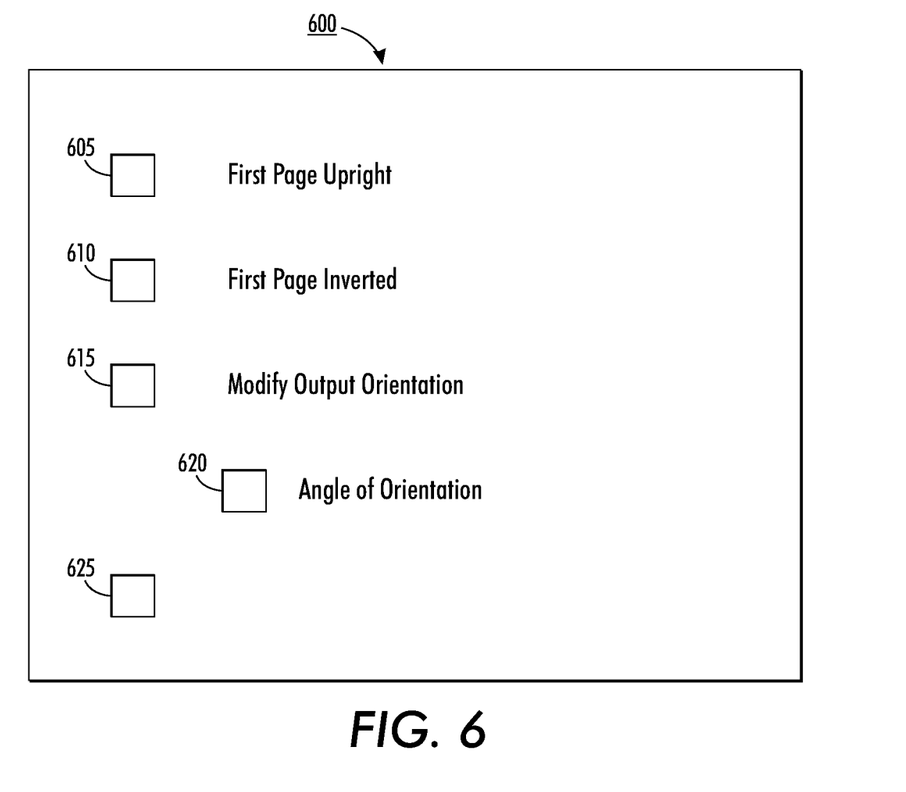
FIG. 6 is an exemplary diagram showing a user interface, in accordance with one possible embodiment of the disclosure.

FIG. 6 is an exemplary diagram showing a user interface, in accordance with one possible embodiment of the disclosure. User interface 600 may include option 605 to enable the user to indicate that the first scanned page is in the upright position. There may be option 610 to enable the user to indicate that the first scanned page is in the inverted position. There may also be option 615 to enable the user to change the orientation of the output from the orientation of the scanned pages. Option 620 may be used to specify the specific angle of orientation of the output. The user may also be able to specify a destination for the electronic format of the output pages using option 625. For example, the destination may be a USB drive or device. As another example, the destination may be an email address. Using the functions of the orientation alignment logic 322, all the scanned pages may have the same orientation in the output without any further manipulation by the user.

Figure 7:
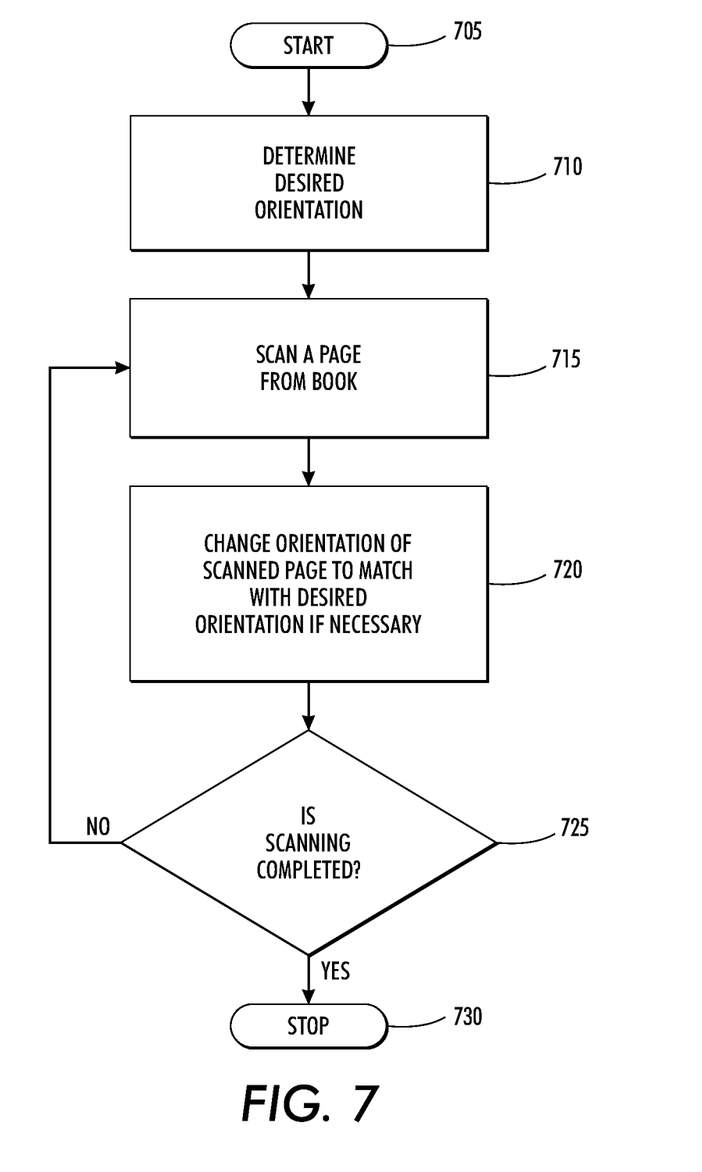
FIG. 7 is a flowchart of an orientation alignment process, in accordance with one possible embodiment of the disclosure.

FIG. 7 is an exemplary flowchart of a book copying process, in accordance with one possible embodiment of the disclosure. The process may begin at block 705. The process may be performed by the orientation alignment logic 322 described and shown in FIG. 3. At block 710, the desired orientation is determined. The desired orientation may be a default orientation, or it may be specified by the user via the user interface 600 (shown in FIG. 6). At block 715, a page from the book is scanned. At block 720, the orientation of the scanned may be modified if necessary. This may be based on the desired orientation being associated with a first scanned page. For example, if the first scanned page has an upright orientation, then the second scanned page has an invert orientation. At block 725, a test may be performed to determine if the scanning is completed. If it is, then the process may end at block 730; otherwise, the process may continue at block 715.

Figure 8:
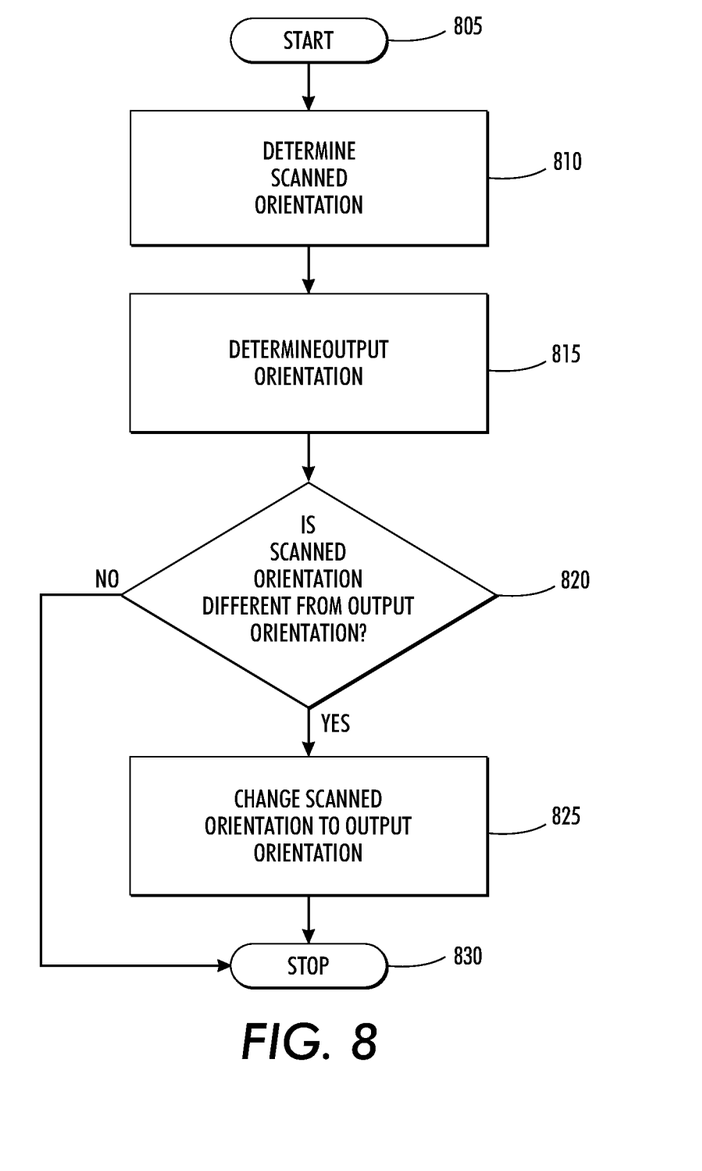
FIG. 8 is a flow chart of changing the orientation of the output to be different from the orientation of the scanned pages, in accordance with one possible embodiment of the disclosure.

FIG. 8 is an exemplary flowchart of modifying an output orientation in a book copying process, in accordance with one possible embodiment of the disclosure. The process may begin at block 805. The process may be performed by the orientation alignment logic 322 described and shown in FIG. 3. At block 810, the scanned orientation is determined. The scanned orientation may be upright or inverted. At block 815, the output orientation may be determined. The output orientation may be specified by the user using the user interface 600 (shown in FIG. 6). At block 820, a test may be performed to determine if the scanned orientation is different from the output orientation. If they are different, the scanned orientation may be modified to become the output orientation, as shown in block 825. If they are the same, then the process may move from block 820 to block 830 and may stop at block 830.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein. It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer-implemented method for aligning orientation of outputs of scanned pages from a book, the method comprising:
    determining an orientation of a first scanned page of a book; and
    modifying, based on the orientation of the first scanned page, an orientation of an output of a second scanned page of the book relative to an orientation of the second scanned page, wherein the second scanned page is in sequence relative to the first scanned page, and wherein the determining of the orientation of the first scanned page and the modifying of the orientation of the output of the second scanned page are to be performed by a computing system configured to enable book copying,
    wherein an orientation of an output of the first scanned page is specified by a user using a user interface associated with the computing system,
    the orientation of the output of the first scanned page includes an angle of orientation of the output of the first scanned page that can be specified by the user using the user interface, and
    the angle of orientation can be other than 0 degrees relative to the first scanned page and other than 180 degrees relative to the first scanned page.

2. The method of claim 1, wherein the orientation of the first scanned page is a default orientation.

3. The method of claim 1, wherein modifying the orientation of the output of the second scanned page comprises inverting the orientation of the second scanned page.

4. The method of claim 3, further comprising inverting orientation of every alternating scanned page of the book.

5. The method of claim 1, wherein the angle of orientation is 90 degrees.

6. The method of claim 1, wherein a destination of the outputs can be specified by the user using the user interface.

7. The method of claim 6, wherein the destination is a USB storage device.

8. A non-transitory computer-readable medium storing instructions for controlling orientation of scanned pages from a book, the instructions comprising:
    determining an orientation of a first scanned page of a book; and
    modifying, based on the orientation of the first scanned page, an orientation of an output of a second scanned page of the book relative to an orientation of the second scanned page, wherein the second scanned page is in sequence relative to the first scanned page, and wherein the determining of the orientation of the first scanned page and the modifying of the orientation of the output of the second scanned page are to be performed by a computing system configured to enable book copying,
    wherein an orientation of an output of the first scanned page is specified by a user using a user interface associated with the computing system,
    the orientation of the output of the first scanned page includes an angle of orientation of the output of the first scanned page that can be specified by the user using the user interface, and
    the angle of orientation can be other than 0 degrees relative to the first scanned page and other than 180 degrees relative to the first scanned page.

9. The non-transient computer-readable medium of claim 8, wherein the orientation of the first scanned page is a default orientation.

10. The non-transient computer-readable medium of claim 8, wherein the angle of orientation is 90 degrees.

11. The non-transient computer-readable medium of claim 8, wherein modifying the orientation of the output of the second scanned page comprises inverting the orientation of the second scanned page.

12. The non-transient computer-readable medium of claim 11, further comprising inverting orientation of every alternating scanned page of the book.

13. The non-transient computer-readable medium of claim 8, wherein a destination of the outputs can be specified by the user using the user interface.

14. The non-transient computer-readable medium of claim 13, wherein the destination is a USB storage device.

15. An image production device, comprising:
    a processor;
    a user interface coupled to the processor; and
    an orientation alignment logic coupled to the processor and configured to
        determine an orientation of a first scanned page of a book, and
        modify, based on the orientation of the first scanned page, an orientation of an output of a second scanned page of the book relative to an orientation of the second scanned page, wherein the second scanned page is in sequence relative to the first scanned page,
    wherein an orientation of an output of the first scanned page is specified by a user using the user interface,
    the orientation of the output of the first scanned page includes an angle of orientation of the output of the first scanned page that can be specified by the user using the user interface, and
    the angle of orientation can be other than 0 degrees relative to the first scanned page and other than 180 degrees relative to the first scanned page.

16. The device of claim 15, wherein the orientation of the first scanned page is a default orientation.

17. The device of claim 15, wherein the angle of orientation is 90 degrees.

18. The device of claim 15, wherein the orientation of the output of the second scanned page is modified by inverting the orientation of the second scanned page.

19. The device of claim 18, wherein the orientation alignment logic is further configured to invert orientation of every alternating scanned page of the book.

20. The device of claim 15, wherein a destination of the outputs can be specified by the user using the user interface.

* * * * *